(12) United States Patent
Hilditch et al.

(10) Patent No.: US 9,297,320 B2
(45) Date of Patent: Mar. 29, 2016

(54) SYSTEMS AND METHODS FOR EXHAUST CATALYST TEMPERATURE CONTROL

(71) Applicant: Ford Global Technologies, LLC, Dearborn, MI (US)

(72) Inventors: James Alfred Hilditch, Canton, MI (US); Michael Howard Shelby, Plymouth, MI (US); Daniel Joseph Styles, Canton, MI (US); Chris Paul Glugla, Macomb, MI (US); Michael Damian Czekala, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 74 days.

(21) Appl. No.: 14/341,484

(22) Filed: Jul. 25, 2014

(65) Prior Publication Data

US 2016/0025021 A1    Jan. 28, 2016

(51) Int. Cl.
*F01N 3/00* (2006.01)
*F02D 41/00* (2006.01)
*F02M 25/07* (2006.01)
*F01N 9/00* (2006.01)

(52) U.S. Cl.
CPC .............. *F02D 41/0052* (2013.01); *F01N 9/00* (2013.01); *F02M 25/0717* (2013.01); *F02M 25/0749* (2013.01); *F01N 2900/1602* (2013.01)

(58) Field of Classification Search
CPC .......... F02M 25/0718; F02M 25/0742; F02M 25/074; F02M 25/0704; F02M 25/0749; F02M 25/0751; F02M 25/0707; F02B 3/06; F02B 47/08; F01N 3/02; F02D 41/0065

USPC .......... 60/273, 274, 278, 285, 286, 299, 284, 60/320, 287, 605.1, 605.2, 602; 123/568.11, 568.15, 568.17, 568.21, 123/698, 559.1

See application file for complete search history.

(56) References Cited

U.S. PATENT DOCUMENTS

| 4,143,635 A | 3/1979 | Iizuka et al. |
| 5,279,515 A | 1/1994 | Moore et al. |

(Continued)

FOREIGN PATENT DOCUMENTS

| JP | 2010071217 A | * 4/2010 |
| WO | 2012108796 A1 | 8/2012 |
| WO | 2014005127 A2 | 1/2014 |

OTHER PUBLICATIONS

Potteau, Sebastian et al., "Cooled EGR for a Turbo SI Engine to Reduce Knocking and Fuel Consumption," SAE Technical Paper Series No. 2007-01-3978, Powertrain & Fluid Systems Conference and Exhibition, Rosemont, Ill., Oct. 29-Nov. 1, 2007, 13 pages.

(Continued)

*Primary Examiner* — Patrick Maines
(74) *Attorney, Agent, or Firm* — Julia Voutyras; Alleman Hall McCoy Russell & Tuttle LLP (57) ABSTRACT

Methods and systems are provided for exhaust catalyst temperature control by metering exhaust bypass flow from a dedicated EGR cylinder. A continuously variable bypass valve may be adjusted to vary an amount of exhaust directed to an exhaust catalyst from a dedicated EGR cylinder via a bypass passage relative to exhaust recirculated to the engine intake via an EGR passage. At lower catalyst temperatures, more exhaust is metered via the bypass passage to enable catalyst temperature to be maintained above an activation level.

10 Claims, 4 Drawing Sheets

(56) References Cited

U.S. PATENT DOCUMENTS

| | | |
|---|---|---|
| 5,746,189 A | 5/1998 | Kuzuya et al. |
| 5,937,807 A | 8/1999 | Peters et al. |
| 6,053,154 A | 4/2000 | Pott |
| 6,138,650 A | 10/2000 | Bailey |
| 6,230,695 B1 | 5/2001 | Coleman et al. |
| 6,293,246 B1 | 9/2001 | Tanahashi et al. |
| 6,394,051 B1 | 5/2002 | Filipe et al. |
| 6,397,790 B1 | 6/2002 | Collier, Jr. |
| 6,405,720 B1 | 6/2002 | Collier, Jr. |
| 6,499,449 B2 | 12/2002 | Michelini et al. |
| 6,543,230 B1 | 4/2003 | Schmid |
| 6,655,324 B2 | 12/2003 | Cohn et al. |
| 6,718,755 B2 | 4/2004 | Brehob |
| 6,820,415 B2 | 11/2004 | Abet et al. |
| 6,826,905 B2 | 12/2004 | Gui et al. |
| 6,918,384 B2 | 7/2005 | Jehlik et al. |
| 6,925,802 B2 | 8/2005 | Arnold |
| 6,968,825 B2 | 11/2005 | Hitomi et al. |
| 7,086,221 B2 | 8/2006 | Pott et al. |
| 7,290,504 B2 | 11/2007 | Lange |
| 7,779,812 B2 | 8/2010 | Leone et al. |
| 7,942,127 B2 | 5/2011 | Leone et al. |
| 8,041,500 B2 | 10/2011 | Leone |
| 8,100,116 B2 | 1/2012 | He et al. |
| 8,108,125 B2 | 1/2012 | Leone |
| 8,150,605 B2 | 4/2012 | Doering et al. |
| 8,230,843 B2 | 7/2012 | Kurtz |
| 8,239,122 B2 | 8/2012 | Leone et al. |
| 8,240,294 B2 | 8/2012 | Surnilla et al. |
| 8,291,891 B2 | 10/2012 | Alger, II et al. |
| 8,352,160 B2 | 1/2013 | Leone |
| 8,352,164 B2 | 1/2013 | Leone et al. |
| 8,511,084 B2 | 8/2013 | Ulrey et al. |
| 8,528,511 B2 | 9/2013 | Price et al. |
| 8,539,768 B2 | 9/2013 | Hayman et al. |
| 8,561,599 B2 | 10/2013 | Gingrich et al. |
| 8,701,409 B2 | 4/2014 | Pursifull et al. |
| 8,763,570 B2 | 7/2014 | Hayman et al. |
| 2009/0308070 A1 | 12/2009 | Alger, II et al. |
| 2010/0205941 A1* | 8/2010 | Okada ............... F02D 1/0065 60/277 |
| 2010/0211292 A1* | 8/2010 | Geyer ............... F02M 25/0738 701/108 |
| 2011/0041495 A1 | 2/2011 | Yager |
| 2011/0253113 A1 | 10/2011 | Roth et al. |
| 2012/0023937 A1 | 2/2012 | Styles et al. |
| 2012/0078492 A1 | 3/2012 | Freund et al. |
| 2012/0204844 A1* | 8/2012 | Gingrich ............. F02B 27/0215 123/568.11 |
| 2012/0204845 A1* | 8/2012 | Gingrich ............. F02M 25/0707 123/568.17 |
| 2012/0260894 A1 | 10/2012 | Hayman |
| 2012/0260897 A1 | 10/2012 | Hayman et al. |
| 2012/0285163 A1 | 11/2012 | Hayman et al. |
| 2012/0285426 A1 | 11/2012 | Hayman et al. |
| 2012/0285427 A1 | 11/2012 | Hayman et al. |
| 2012/0323470 A1 | 12/2012 | Klingbeil et al. |
| 2013/0220286 A1 | 8/2013 | Gingrich et al. |
| 2013/0239547 A1* | 9/2013 | Gingrich ............. F01N 3/105 60/274 |
| 2013/0276730 A1 | 10/2013 | Borean et al. |
| 2014/0142833 A1* | 5/2014 | Gingrich ............. F02D 41/0255 701/103 |
| 2014/0196703 A1 | 7/2014 | Boyer et al. |
| 2015/0121851 A1* | 5/2015 | Dane ............. F02M 25/0724 60/274 |
| 2015/0219028 A1* | 8/2015 | Gingrich ............. F02D 41/0065 123/445 |

OTHER PUBLICATIONS

Alger, Terry et al., "Dedicated EGR: A New Concept in High Efficiency Engines," SAE Technical Paper Series No. 2009-01-0694, Southwest Research Institute, 12 pages.

Ulrey, Joseph N. et al., "Dedicated EGR Cylinder Post Combustion Injection," U.S. Appl. No. 13/915,445, filed Jun. 11, 2013, 34 pages.

Martin, Douglas R. et al., "Method and System for EGR Control," U.S. Appl. No. 14/327,379, filed Jul. 9, 2014, 48 pages.

Leone, Thomas G. et al., "Systems and Methods for EGR Control," U.S. Appl. No. 14/298,733, filed Jun. 6, 2014, 45 pages.

Leone, Thomas G. et al., "Systems and Methods for Improving Operation of a Highly Dilute Engine," U.S. Appl. No. 14/271,248, filed May 6, 2014, 40 pages.

Glugla, Chris P., "Systems and Methods for Boost Control," U.S. Appl. No. 14/307,165, filed Jun. 17, 2014, 56 pages.

Hilditch, James A. et al., "Systems and Methods for Dedicated EGR Cylinder Exhaust Gas Temperature Control," U.S. Appl. No. 14/334,329, filed Jul. 17, 2014, 34 pages.

Leone, Thomas G. et al., "Systems and Methods for Dedicated EGR Cylinder Valve Control," U.S. Appl. No. 14/297,232, filed Jun. 5, 2014, 36 pages.

* cited by examiner

SYSTEMS AND METHODS FOR EXHAUST CATALYST TEMPERATURE CONTROL

FIELD

The present description relates to systems and methods for improving exhaust catalyst temperature control in engine systems configured with a sole cylinder for providing external EGR to other engine cylinders.

BACKGROUND AND SUMMARY

Engines may be configured with exhaust gas recirculation (EGR) systems to divert at least some exhaust gas from an engine exhaust manifold to an engine intake manifold. By providing a desired engine dilution, such systems reduce engine knock, throttling losses, in-cylinder heat losses, as well as NOx emissions. As a result, fuel economy is improved, especially at higher levels of engine boost. Engines have also been configured with a sole cylinder (or cylinder group) that is dedicated for providing external EGR to other engine cylinders. Therein, all of the exhaust from the dedicated cylinder group is recirculated to the intake manifold. As such, this allows a substantially fixed amount of EGR to be provided to engine cylinders at most operating conditions. By adjusting the fueling of the dedicated EGR cylinder group (e.g., to run rich), the EGR composition can be varied to include species such as Hydrogen which improve the EGR tolerance of the engine and resulting fuel economy benefits.

Engine systems with dedicated EGR cylinder groups may be configured with a diverter valve which allows all the exhaust from the dedicated EGR cylinder group to either be directed back to the intake manifold or diverted to the exhaust catalyst. An example of such a system with a diverter valve is shown by Hayman et al. in U.S. Pat. No. 8,539,768. By diverting exhaust from the dedicated EGR cylinder to the exhaust catalyst, heat flow to the catalyst can be increased, such as during engine cold-start and catalyst warm-up conditions. In addition, the EGR rate can be decreased at light loads.

However, the inventors herein have identified potential issues with such an approach. As an example, the diverter valve may provide limited choices. In particular, the controller may be constrained between directing all the exhaust to the intake manifold, which improves fuel economy but reduces exhaust catalyst temperature, or directing all the exhaust to the catalyst, which improves catalyst temperature but reduces fuel economy. Thus during the redirecting of exhaust for catalyst warming, EGR is temporarily disabled, even though engine dilution may be required. As such, this results in a drop in engine performance and fuel economy. As another example, there may be conditions other than during an engine cold-start when catalyst temperature control is required. For example, the exhaust catalyst can cool below its optimal conversion temperature during extended light load operation since pre-catalyst exhaust temperatures are typically lower at lighter loads. The exhaust gas temperature may be further cooled by the addition of high levels of EGR to the combustion chamber. As such, if the exhaust catalyst temperature drops below a threshold temperature during engine operation, an emissions conversion rate is degraded, adversely affecting engine exhaust emissions.

The inventors have recognized these issues and have developed a method for exhaust catalyst temperature control that at least partly overcomes some of the issues. One example method includes flowing exhaust from a dedicated EGR cylinder to each of an exhaust catalyst via a bypass passage and an engine intake via an EGR passage; and adjusting a relative flow through the passages via a bypass valve, the adjusting responsive to catalyst temperature. In this way, exhaust may be flowed from the dedicated EGR cylinder to each of the engine intake and the exhaust catalyst, concurrently, their relative ratios metered to provide a desired exhaust catalyst temperature.

As an example, an EGR passage coupling a dedicated EGR cylinder to an engine intake may include a continuously variable bypass valve that allows a portion of the exhaust gas to be metered to an exhaust catalyst in the exhaust manifold via a bypass passage. As such, the remaining portion of the exhaust gas may continue to be recirculated to the engine intake via the EGR passage. Based on a temperature of the exhaust catalyst, the bypass valve may be adjusted to vary a ratio of exhaust flow through the bypass passage relative to the EGR passage. For example, during conditions when catalyst temperature is below a threshold, such as during a cold-start condition or after an extended operation at light load, the bypass valve may be adjusted to increase exhaust flow through the bypass passage while correspondingly decreasing exhaust flow through the EGR passage. In addition, the dedicated EGR cylinder may be enriched to provide a hydrogen, $CO_2$ and hydrocarbon-rich exhaust stream at the exhaust catalyst. The degree of richness may be adjusted based on the heat flux required to bring the exhaust catalyst to or above a threshold temperature. For example, for a given flow rate through the bypass passage, as a difference between the exhaust catalyst and the threshold temperature increases, the dedicated EGR cylinder may be fueled more rich. Concurrently, remaining engine cylinders may be fueled lean, the degree of leanness adjusted based on the degree of richness of the dedicated EGR cylinder to maintain an overall tailpipe exhaust air-fuel ratio at or around stoichiometry. The rich exhaust from the dedicated EGR cylinder may then be combined with the lean exhaust from the remaining cylinders to generate a significantly exothermic reaction at the catalyst, further expediting catalyst heating. As the catalyst temperature exceeds the threshold, the bypass valve may be adjusted to reduce exhaust flow through the bypass while increasing exhaust flow recirculated to the engine intake.

In this way, a bypass valve coupled to a dedicated EGR system may be actuated to maintain an exhaust catalyst temperature. By continuously diverting at least some exhaust gas to an exhaust catalyst while recirculating a remaining portion of the exhaust gas to the engine intake, catalyst temperature control is enabled without requiring EGR to be disabled. By enriching the dedicated EGR cylinder group based on the flow through the bypass valve, catalyst heating can be expedited. By combining rich exhaust (which is hydrocarbon-enriched) from the dedicated EGR cylinder group with lean exhaust (which is oxygen-enriched) from remaining engine cylinders at the exhaust catalyst, a significant exothermic reaction can be generated to maintain the exhaust catalyst above an activation temperature. In addition, by enabling the exothermic reaction to occur directly at the exhaust catalyst, heat transfer is improved, and heat loss to other engine components (such as the cylinder head, turbine, exhaust plumbing, etc.) is reduced. By allowing catalyst temperature to be controlled without disabling EGR delivery, exhaust emissions can be improved without incurring fuel economy losses.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
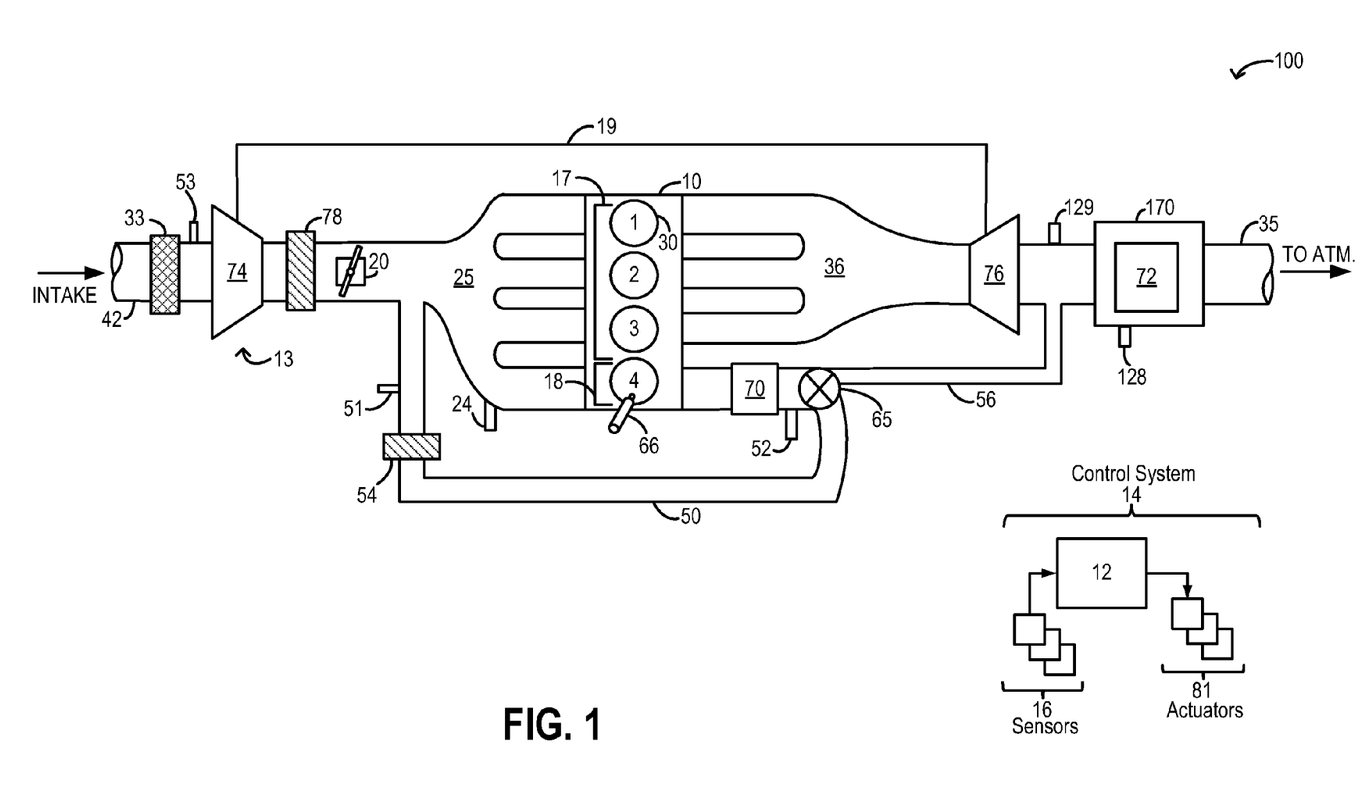
FIG. 1 is a schematic diagram of an engine system including a dedicated EGR donating cylinder group.
Figure 2:
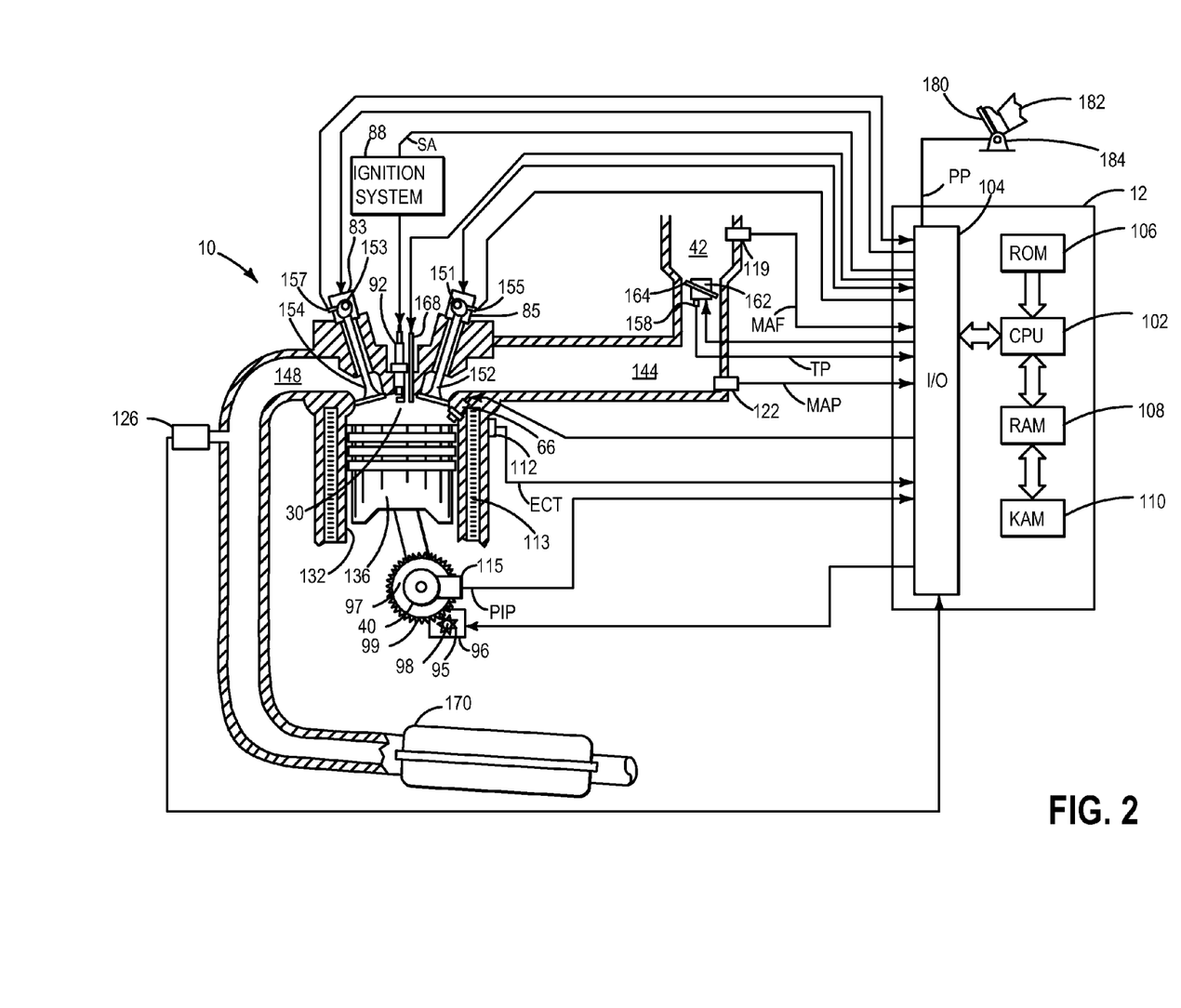
FIG. 2 is a schematic depiction of a combustion chamber of the engine.

The present description is related to exhaust catalyst temperature control on an engine operating with highly diluted cylinder mixtures, such as the engine systems of FIGS. 1-2, wherein exhaust from a dedicated cylinder group is used to provide external EGR to the engine. A controller may be configured to perform a control routine, such as the routine of FIG. 3 to continually vary a proportion of exhaust diverted from the dedicated cylinder group to an exhaust catalyst, while bypassing remaining engine cylinders, relative to exhaust recirculated to the engine intake, based on catalyst temperature. In doing so, the exhaust catalyst can be maintained above an operational temperature while EGR is delivered. An example adjustment for exhaust catalyst temperature control during engine operation, including during and after an engine cold-start, is shown with reference to FIG. 4.

FIG. 1 schematically shows aspects an example engine system 100 including an engine 10 with four cylinders (1-4). As elaborated herein, the four cylinders are arranged as a first cylinder group 18 consisting of dedicated EGR cylinder 4 and a second cylinder group 17 consisting of non-dedicated EGR cylinders 1-3. A detailed description of each combustion chamber of engine 10 is provided with reference to FIG. 2. Engine system 100 may be coupled in a vehicle, such as a passenger vehicle configured for road travel.

In the depicted embodiment, engine 10 is a boosted engine coupled to a turbocharger 13 including a compressor 74 driven by a turbine 76. Specifically, fresh air is introduced along intake passage 42 into engine 10 via air cleaner 33 and flows to compressor 74. A flow rate of ambient air that enters the intake system through intake air passage 42 can be controlled at least in part by adjusting intake throttle 20. Compressor 74 may be any suitable intake-air compressor, such as a motor-driven or driveshaft driven supercharger compressor. In engine system 10, however, the compressor is a turbocharger compressor mechanically coupled to turbine 76 via a shaft 19, the turbine 76 driven by expanding engine exhaust. In one embodiment, the compressor and turbine may be coupled within a twin scroll turbocharger. In another embodiment, the turbocharger may be a variable geometry turbocharger (VGT), where turbine geometry is actively varied as a function of engine speed. In still further embodiments, engine 10 may be a naturally aspirated engine having no boosting device.

As shown in FIG. 1, compressor 74 is coupled, through charge-air cooler 78 to intake throttle 20. Intake throttle 20 is coupled to engine intake manifold 25. From the compressor, the compressed air charge flows through the charge-air cooler and the throttle valve to the intake manifold. The charge-air cooler may be an air-to-air or air-to-water heat exchanger, for example. In the embodiment shown in FIG. 1, the pressure of the air charge within the intake manifold is sensed by manifold air pressure (MAP) sensor 24. A compressor by-pass valve (not shown) may be coupled in series between the inlet and the outlet of compressor 74. The compressor by-pass valve may be a normally closed valve configured to open under selected operating conditions to relieve excess boost pressure. For example, the compressor by-pass valve may be opened during conditions of decreasing engine speed to avert compressor surge.

Intake manifold 25 is coupled to a series of combustion chambers 30 through a series of intake valves (see FIG. 2). The combustion chambers are further coupled to exhaust manifold 36 via a series of exhaust valves (see FIG. 2). In the depicted embodiment, exhaust manifold 36 includes a plurality of exhaust manifold sections to enable effluent from different combustion chambers to be directed to different locations in the engine system. In particular, effluent from the second, non-dedicated EGR cylinder group 17 (cylinders 1-3) is directed through turbine 76 of exhaust manifold 36 before being processed by an exhaust catalyst of emission control device 170.

Combustion chambers 30 may be supplied one or more fuels, such as gasoline, alcohol fuel blends, diesel, biodiesel, compressed natural gas, etc. Fuel may be supplied to the combustion chambers via injector 66. Fuel injector 66 may draw fuel from a fuel tank (not shown). In the depicted example, fuel injector 66 is configured for direct injection though in other embodiments, fuel injector 66 may be configured for port injection or throttle valve-body injection. Further, each combustion chamber may include one or more fuel injectors of different configurations to enable each cylinder to receive fuel via direct injection, port injection, throttle valve-body injection, or combinations thereof. In the combustion chambers, combustion may be initiated via spark ignition and/or compression ignition.

Exhaust from exhaust manifold 36 is directed to turbine 76 to drive the turbine. When reduced turbine torque is desired, some exhaust may be directed instead through a wastegate (not shown), by-passing the turbine. The combined flow from the turbine and the wastegate then flows through emission control device 170. In general, one or more emission control devices 170 may include one or more exhaust after-treatment catalysts, such as exhaust catalyst 72, configured to catalytically treat the exhaust flow. Treating the exhaust flow may include reducing an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Further still, at least one function of the exhaust catalyst may include oxidizing products of rich combustion (e.g., HC, CO, H2). This enables improved catalyst warming, as elaborated in the methods used herein. Different exhaust after-treatment catalysts having any such functionality may be arranged in wash coats or elsewhere in the exhaust after-treatment stages, either separately or together. In some embodiments, the exhaust after-treatment stages may include a regenerable soot filter configured to trap and oxidize soot particles in the exhaust flow. All or part of the treated exhaust from emission control device 170 may be released into the atmosphere via exhaust conduit 35.

In some examples, an exhaust gas temperature sensor 128 may be coupled to the catalyst brick. For example, the temperature sensor may be coupled upstream of the brick or coupled in the brick (as depicted). As elaborated herein with reference to FIG. 3, the output of the temperature sensor coupled to the brick may be used to assess the catalyst temperature management routine of FIG. 3. In alternate examples, the catalyst temperature may be modeled based on engine operating conditions.

EGR passage 50 is configured to selectively route exhaust from the first, dedicated EGR cylinder group 18 to intake manifold 25 at a location downstream of intake throttle 20. In alternate examples, the exhaust may be recirculated to an intake manifold 25 at a location upstream of compressor 74. The portion of exhaust routed from the dedicated EGR cylinder group 18 (cylinder 4) to intake manifold 25 via EGR passage 50 is delivered via an EGR cooler 54. EGR passage 50 may include an exhaust water-gas shift (WGS) 70. Thus the exhaust may be processed by WGS catalyst 70 before being recirculated to the intake. Exhaust WGS catalyst 70 is configured to generate hydrogen gas from rich exhaust gas received in passage 50 from cylinder 4.

Bypass passage 56 couples EGR passage 50, at a location downstream of exhaust water-gas shift catalyst 70 to exhaust manifold 36, at a location upstream of exhaust catalyst 72. In the depicted example, bypass passage is coupled to the exhaust manifold downstream of turbine 76. However in alternate examples, bypass passage 56 may be coupled upstream of turbine 76. In alternate examples, WGS catalyst 70 may be positioned in EGR passage 50, after bypass valve 65

A bypass valve 65 is coupled at a junction of EGR passage 50 and bypass passage 56. Bypass valve 65 may be a metering valve configured to meter or vary a portion of exhaust routed from dedicated cylinder group 18 to exhaust catalyst 72 via the bypass passage relative to exhaust recirculated to the intake via the EGR passage. In one example, bypass valve 65 is a continuously variable valve. In an alternate example, bypass valve 65 may be any other metering valve. That is, valve 65 is not just a two-position actuator. By adjusting a position of continuously variable bypass valve 65, a first portion of exhaust gas is routed from the dedicated EGR cylinder group to the exhaust catalyst while bypassing remaining engine cylinders while a second, remaining portion of the exhaust gas is recirculated to the engine intake. In other words, exhaust is directed from first cylinder group 18 to each of exhaust catalyst 72 (via bypass passage 56) and recirculated to engine intake 25 (via EGR passage 50), concurrently. As elaborated herein with reference to FIG. 3, the ratio of the first portion relative to the second portion is adjusted responsive to catalyst temperature during an engine start as well as during engine operation. For example, during an engine cold-start, or during catalyst warm-up conditions, responsive to a temperature of the exhaust catalyst being lower than an optimal temperature, the portion of exhaust diverted to the exhaust catalyst may be increased while the portion of exhaust recirculated to the intake is correspondingly decreased. In this way, exhaust from the dedicated EGR cylinder can be routed to the exhaust catalyst to expedite catalyst heating without disabling EGR and without degrading engine fuel economy.

Each of cylinders 1-4 may include internal EGR by trapping exhaust gases from a combustion event in the respective cylinder and allowing the exhaust gases to remain in the respective cylinder during a subsequent combustion event. The amount of internal EGR may be varied via adjusting intake and/or exhaust valve opening and/or closing times. For example, by increasing intake and exhaust valve overlap, additional EGR may be retained in the cylinder during a subsequent combustion event. External EGR is provided to cylinders 1-4 solely via exhaust flow from the first cylinder group 18 (herein, cylinder 4) and EGR passage 50. In another example, external EGR may only be provided to cylinders 1-3 and not to cylinder 4. External EGR is not provided by exhaust flow from cylinders 1-3. Thus, in this example, cylinder 4 is the sole source of external EGR for engine 10 and therefore is also referred to herein as the dedicated EGR cylinder (or dedicated cylinder group). By recirculating exhaust from one cylinder of the four-cylinder engine to the engine intake manifold, a nearly constant (e.g., around 25%) EGR rate can be provided. Cylinders 1-3 are also referred to herein as a non-dedicated EGR cylinder group. While the current example shows the dedicated EGR cylinder group as having a single cylinder, it will be appreciated that in alternate engine configurations, the dedicated EGR cylinder group may have more engine cylinders.

EGR passage 50 may include an EGR cooler 54 for cooling EGR delivered to the engine intake. In addition, EGR passage 50 may include a first exhaust gas sensor 51 for estimating an air-fuel ratio of the exhaust recirculated from the first cylinder group to the remaining engine cylinders. A second exhaust gas sensor 52 may be positioned downstream of the exhaust manifold sections of the second cylinder group for estimating an air-fuel ratio of exhaust in the second cylinder group. Still further exhaust gas sensors may be included in the engine system of FIG. 1.

A hydrogen concentration in external EGR from cylinder 4 may be increased via enriching an air-fuel mixture combusted in cylinder 4. In particular, the amount of hydrogen gas generated at WGS catalyst 70 may be increased by increasing the degree of richness of exhaust received in passage 50 from cylinder 4. Thus, to provide hydrogen enriched exhaust to engine cylinders 1-4, fueling of the first cylinder group 18 may be adjusted so that cylinder 4 is enriched. In one example, the hydrogen concentration of the external EGR from cylinder 4 may be increased during conditions when engine combustion stability is less than desired. This action increases hydrogen concentration in external EGR and it may improve engine combustion stability, especially at lower engine speeds and loads (e.g., idle). In addition, the hydrogen enriched EGR allows much higher levels of EGR to be tolerated in the engine, as compared to conventional (lower hydrogen concentration) EGR, before encountering any combustion stability issues. By increasing the range and amount of EGR usage, engine fuel economy is improved. When operating the first cylinder group rich, the second cylinder group may be operated lean to provide a substantially stoichiometric exhaust at the tailpipe.

Figure 3:
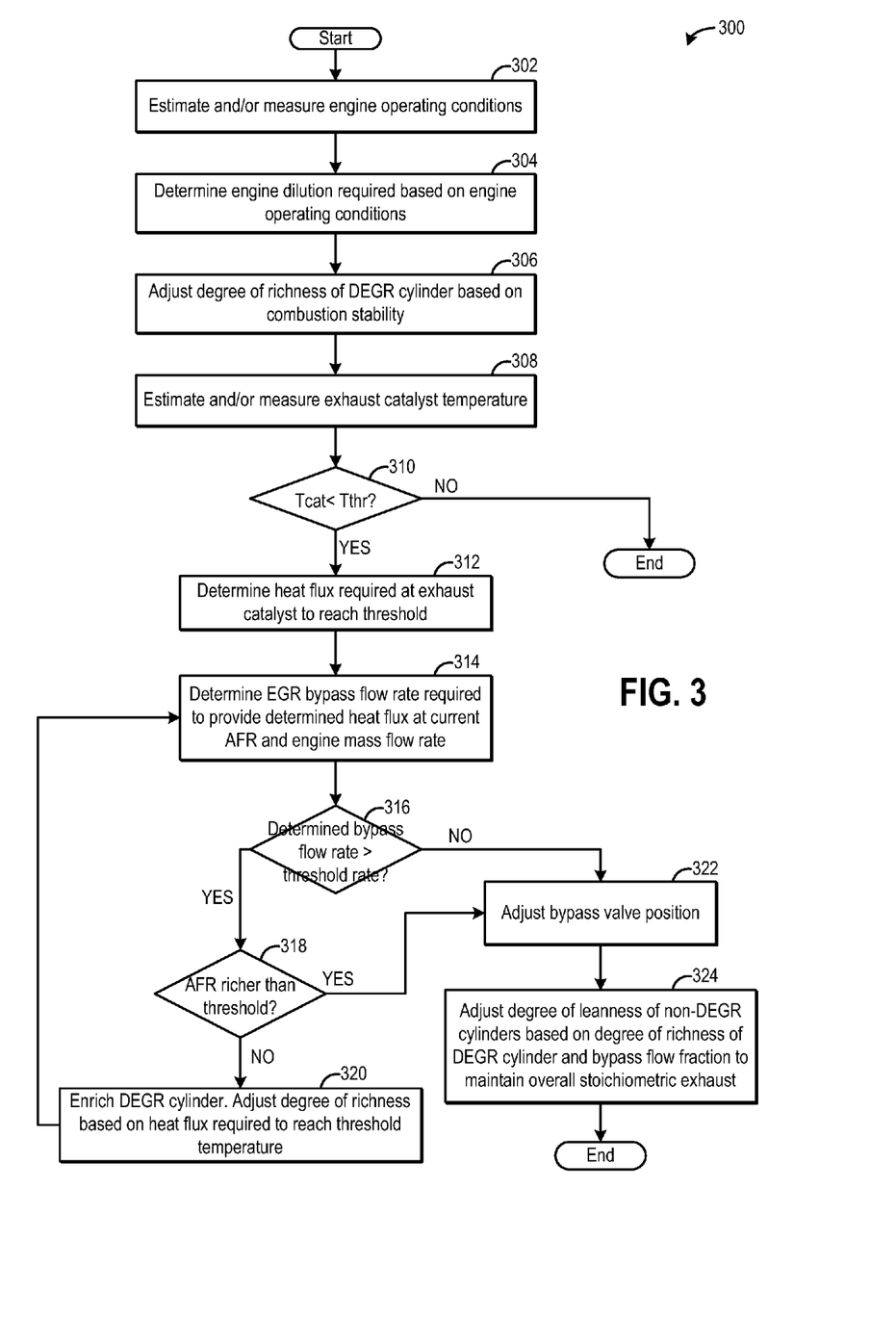
FIG. 3 shows an example method for adjusting a bypass valve to vary a relative flow of exhaust from a dedicated EGR cylinder to each of an exhaust catalyst and an engine intake based on an exhaust catalyst temperature.

As also elaborated with reference to FIG. 3, the degree of richness of the first cylinder group may also be adjusted based on the temperature of exhaust catalyst 72 so as to expedite catalyst heating. For example, the degree of richness may be increased as the catalyst temperature falls below a threshold temperature. By mixing the enriched exhaust from the first cylinder group with lean exhaust received at exhaust catalyst 72 from the remaining engine cylinders, an exothermic reaction can be provided directly at the exhaust catalyst, improving catalyst heating.

In some embodiments, the cylinders of the second cylinder group 17 may be configured for selective deactivation wherein one or more of the cylinders are selectively deactivated based on engine load. For example, at lower engine loads, one or more of cylinders 1-3 may be deactivated while the engine load and torque demand is met by the remaining combusting cylinders. The cylinders may be selectively deactivated through the use of selectively deactivatable fuel injectors and/or valves. By operating the engine with one or more of cylinders 1-3 deactivated, the overall EGR rate of the engine can be varied. For example, on an I4 engine having 4 cylinders in an in-line configuration and one dedicated EGR (DEGR) cylinder, a nominal 25% EGR rate is delivered to the engine intake. However, if one of the three non-DEGR cylinders is deactivated, the effective EGR rate can be increased to 33%. This higher EGR rate may be applied in mid-load areas of the engine speed-load map where higher EGR rates are beneficial and the torque of all four cylinders is not required.

In another example, on a 6-cylinder engine, one cylinder may be configured as the dedicated EGR (DEGR) cylinder providing a nominal EGR rate of 16.7%. Herein, if one non-DEGR cylinder were deactivated, the EGR rate would become a nominal 20%, if two non-DEGR cylinders were deactivated, the EGR rate would becomes 25%, and if three non-DEGR cylinders were deactivated, the EGR rate would becomes 33%. The engine may be operated in different modes, each mode having a different number of non-DEGR cylinders deactivated. The mode of operation may be selected to correspond to progressively higher EGR rates. Further, the progressively higher EGR rates may be matched with progressively lower engine torque requirements, such as on an engine speed-load map, where fewer cylinders are required and higher EGR rates are advantageous.

In addition, by selectively deactivating one or more cylinders of the non-dedicated EGR cylinder group based on engine dilution requirement (or EGR demand), pulsations to the turbocharger turbine can be evened out as the cylinder firing 180 crank angle degrees opposed to the dedicated EGR cylinder could be deactivated. This allows for even pressure pulsations to the turbine spaces at 180 degrees.

Engine system 100 further includes a control system 14. Control system 14 includes a controller 12, which may be any electronic control system of the engine system or of the vehicle in which the engine system is installed. Controller 12 may be configured to make control decisions based at least partly on input from one or more sensors 16 within the engine system, and may control actuators 81 based on the control decisions. For example, controller 12 may store computer-readable instructions in memory, and actuators 81 may be controlled via execution of the instructions. Example sensors include MAP sensor 24, MAF sensor 53, exhaust gas temperature and pressure sensors 128 and 129, and exhaust gas oxygen sensors 51, 52. Example actuators include throttle 20, fuel injector 66, dedicated cylinder group bypass valve 65, etc. Additional sensors and actuators may be included, as described in FIG. 2. Storage medium read-only memory in controller 12 can be programmed with computer readable data representing instructions executable by a processor for performing the methods described below, as well as other variants that are anticipated but not specifically listed. Example methods and routines are described herein with reference to FIG. 3.

Referring to FIG. 2, internal combustion engine 10 comprises a plurality of cylinders as shown in FIG. 1, one cylinder of which is described now. Engine 10 includes combustion chamber 30 and cylinder walls 132 with piston 136 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 144 and exhaust manifold 148 via respective intake valve 152 and exhaust valve 154. Each intake and exhaust valve may be operated independently by an intake cam 151 and an exhaust cam 153. Intake valve adjuster 85 advances or retards the phase of intake valve 152 relative to a position of crankshaft 40. Additionally, intake valve adjuster 85 may increase or decrease an intake valve lift amount. Exhaust valve adjuster 83 advances or retards the phase of exhaust valve 154 relative to a position of crankshaft 40. Further, exhaust valve adjuster 83 may increase or decrease an exhaust valve lift amount. The position of intake cam 151 may be determined by intake cam sensor 155. The position of exhaust cam 153 may be determined by exhaust cam sensor 157. In cases where combustion chamber 30 is part of a dedicated EGR cylinder, the timing and/or lift amount of valves 152 and 154 may be adjusted independently of other engine cylinders so that the cylinder air charge of the dedicated EGR cylinder may be increased or decreased relative to other engine cylinders. In this way, external EGR supplied to engine cylinders may exceed twenty five percent of the cylinder charge mass. External EGR is exhaust that is pumped out of exhaust valves of a cylinder and returned to cylinders via cylinder intake valves. Further, the internal EGR amount of cylinders other than the EGR cylinder may be adjusted independently of the dedicated EGR cylinder by adjusting valve timing of those respective cylinders. Internal EGR is exhaust that remains in a cylinder after a combustion event and is part of a mixture in the cylinder for a subsequent combustion event.

Fuel injector 66 is shown positioned to inject fuel directly into cylinder 30, which is known to those skilled in the art as direct injection. Alternatively, fuel may be injected to an intake port, which is known to those skilled in the art as port injection. In some example engine configurations, one or more engine cylinders may receive fuel from both direct and port fuel injectors.

In some embodiments, the dedicated EGR cylinder may be selectively deactivated by shutting off air instead of, or in addition to, shutting off fuel. For example, either the intake valves or the exhaust valves of the dedicated EGR cylinder may be deactivated. By deactivating either the intake valves or the exhaust valves, the pumping work of the cylinder may be increased, which may be desired during catalyst warm-up. Maximizing pumping work of the dedicated EGR cylinder may also include adjusting cam phasing, valve lift, the position of a port throttle, or a charge motion control device, etc. Alternatively, all valves of the dedicated EGR cylinder may be deactivated when it is desired to reduce EGR without increasing pumping work, for example at low engine loads after the catalyst is warmed up.

Intake manifold 144 is shown communicating with optional electronic throttle 162 which adjusts a position of throttle plate 164 to control air flow from air intake 42 to intake manifold 144. In some examples, throttle 162 and throttle plate 164 may be positioned between intake valve 152 and intake manifold 144 such that throttle 162 is a port throttle. Driver demand torque may be determined from a position of accelerator pedal 180 as sensed by accelerator pedal sensor 184. A voltage or current indicative of driver demand torque is output from accelerator pedal sensor 184 when driver's foot 182 operates accelerator pedal 180.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 148 upstream of catalytic converter 170. Alternatively, a two-state exhaust gas oxygen sensor may be substituted for UEGO sensor 126.

Converter 170 can include multiple catalyst bricks, in one example. In another example, multiple emission control devices, each with multiple bricks, can be used. Converter 170 can be a three-way type catalyst in one example.

Controller 12 is shown in FIG. 2 as a conventional microcomputer including: microprocessor unit 102, input/output ports 104, read-only (non-transitory) memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 113; a measurement of engine manifold pressure (MAP) from pressure sensor 122 coupled to intake manifold 44; an engine position sensor from a Hall effect sensor 115 sensing crankshaft 40 position; a measurement of air mass entering the engine from sensor 119; and a measurement of throttle position from sensor 158. Barometric pressure may also be sensed (sensor not shown) for processing by controller 12. In a preferred aspect of the present description, engine position sensor 115 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 154 closes and intake valve 152 opens. Air is introduced into combustion chamber 30 via intake manifold 144, and piston 136 moves to the bottom of the cylinder so as to increase the volume within combustion chamber 30. The position at which piston 136 is near the bottom of the cylinder and at the end of its stroke (e.g. when combustion chamber 30 is at its largest volume) is typically referred to by those of skill in the art as bottom dead center (BDC). During the compression stroke, intake valve 152 and exhaust valve 154 are closed. Piston 136 moves toward the cylinder head so as to compress the air within combustion chamber 30. The point at which piston 136 is at the end of its stroke and closest to the cylinder head (e.g. when combustion chamber 30 is at its smallest volume) is typically referred to by those of skill in the art as top dead center (TDC).

In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 136 back to BDC. Crankshaft 40 converts piston movement into a rotational torque of the rotary shaft. Finally, during the exhaust stroke, the exhaust valve 154 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

Thus the components of FIGS. 1-2 provides for an engine system configured to adjust a position of a continuously variable bypass valve to route a first portion of exhaust gas from an enriched dedicated EGR cylinder to an exhaust catalyst while routing a remaining portion of the hydrogen-enriched exhaust gas to an intake manifold, a ratio of the first portion relative to the second portion adjusted responsive to a temperature of the exhaust catalyst.

Turning now to FIG. 3, an example method 300 is shown for adjusting a bypass valve that meters a portion of exhaust from a dedicated EGR cylinder group to an exhaust catalyst while recirculating a remaining portion of exhaust to the engine intake. In this way, the method allows for catalyst temperature control while also providing engine dilution.

At 302, the routine includes estimating and/or measuring engine operating conditions such as engine speed, load, boost pressure, MAP, intake air flow, ambient conditions such as ambient pressure, temperature, humidity, catalyst temperature, etc.

At 304, the routine includes determining an engine dilution required based on the engine operating conditions. For example, the engine dilution requirement may be more at lower engine loads as compared to higher engine loads. At 306, a degree of richness of the dedicated EGR cylinder group may be adjusted based on the engine combustion stability limit to provide the desired engine dilution. For example, at low engine loads, where engine dilution delivery can lead to combustion instability, a degree of richness of the dedicated EGR cylinder group may be increased so as to generate hydrogen rich exhaust (via the WGS catalyst in the EGR passage) which improves the engine's combustion stability limit. The degree of richness may be increased to improve the combustion stability limit for a given amount of engine dilution.

At 308, the routine includes estimating and/or measuring exhaust catalyst temperature. Specifically, the temperature of an emission control device exhaust catalyst, such as exhaust catalyst 72 of FIG. 1, may be estimated. The temperature of the exhaust catalyst may be based on one or more of a catalyst model, direct measurement via a catalyst temperature sensor (such as temperature sensor 128 coupled in the exhaust catalyst brick), an engine event number, and a duration of engine operation. In one example, the catalyst temperature may be estimated by a temperature sensor coupled to the emission control device, such as sensor 128 of FIG. 1. In another example, the catalyst temperature may be modeled based on measured or estimated exhaust gas temperature, time at a given engine condition, and heat release within the catalyst.

For example, the controller may estimate or map the steady-state exhaust gas temperature leaving the manifold based primarily on engine speed and/or load. This temperature estimate is then modified based on spark retard applied and air-fuel ratio. The estimate may be further adjusted based on coolant temperature. The temperature is then delayed to downstream locations and a time constant is applied to account for thermal inertia in the system. Finally, the catalyst temperature is further modified by an internal heating model that takes into account the exhaust mass flow rate and the air-fuel ratio.

At 310, it may be determined if the estimated exhaust catalyst temperature is below a threshold temperature. In one example, the threshold temperature may be a catalyst light-off temperature below which the catalyst is not activated. Thus, it may be desired to maintain the exhaust catalyst temperature at or above the threshold temperature to ensure optimal catalyst operation and catalytic conversion of exhaust components. In one example, the catalyst temperature may be below the threshold temperature during an engine cold-start condition. In another example, the catalyst temperature may be below the threshold temperature during catalyst warm-up conditions. Further still, during engine operation, if the engine is operated at low engine loads for an extended duration, the catalyst temperature may drop below the optimal temperature due to lower temperature of engine exhaust at low engine loads. As elaborated herein, a controller may be configured to continually flow exhaust from a dedicated EGR cylinder to each of an exhaust catalyst via a bypass passage and an engine intake via an EGR passage while adjusting a relative flow through the passages via a bypass valve (such as the continuously variable bypass valve of FIG. 1), the adjusting responsive to catalyst temperature. In doing so, the catalyst temperature may always be maintained at or above the threshold temperature, during an engine start as well as during engine operation, without requiring EGR to be temporarily disabled. If the exhaust catalyst temperature is above the threshold temperature, it may be determined that the exhaust catalyst is sufficiently hot, and the routine may end. As such, when exhaust catalyst temperature control is not required, a fueling of the EGR cylinder group may be adjusted based on engine dilution and combustion stability requirements only.

If the exhaust catalyst temperature is below the threshold temperature, at 312, the routine includes determining a heat flux required at the exhaust catalyst to reach the threshold temperature. In one example, this may be based on a difference between the current exhaust catalyst temperature and the threshold. The difference may be further based on ambient conditions, such as ambient temperature. For example, as a difference between the exhaust catalyst temperature and the threshold temperature increases, the heat flux required may also increase. In further examples, a heat flux required to heat the catalyst in a desired time frame (e.g., in time T) may also be determined. For example, during an engine cold-start, a heat flux required to heat the catalyst in 15 seconds or less may be determined.

At 314, an EGR bypass flow rate required to provide the determined heat flux at the current EGR exhaust air-fuel ratio and the current engine mass flow rate may be determined. Herein, the controller may adjust a relative flow through the passages via a bypass valve responsive to catalyst temperature to provide the desired heat flux. In particular, the controller may increase the relative flow through the bypass passage while correspondingly decreasing flow through the EGR passage as the catalyst temperature falls below a threshold to provide more heat flux to the exhaust catalyst. Then, as the catalyst temperature flow exhaust from a dedicated EGR cylinder to each of an exhaust catalyst via a bypass pas exceeds the threshold, the controller may decrease the relative flow through the bypass passage while correspondingly increasing flow through the EGR passage.

At 316, it may be determined if the required bypass flow rate is higher than a threshold rate. The threshold rate may be based on the maximum flow capability of the bypass valve. For example, the calculated required bypass flow rate may exceed the maximum available flow with the valve in full by-pass position. The threshold rate may also be based on the required EGR rate to the engine to provide fuel economy improvements. For example, at 60% by-pass flow, each engine cylinder for a 4-cylinder engine will receive 10% EGR. This may be the minimum amount to provide a significant improvement in fuel economy.

If the required bypass flow rate is not higher than the threshold rate, at 322, the routine includes adjusting the bypass valve to provide the desired flow rate through the bypass passage. If the required bypass flow rate is higher than the threshold rate, catalyst heating may be expedited using rich exhaust from the dedicated EGR cylinder group. Specifically, at 318, it may be determined if the combustion air-fuel ratio of the dedicated EGR cylinder group is richer than a threshold. The threshold may be based on combustion stability or particulate emissions limits in the dedicated EGR cylinder group. If not, at 320, the routine includes enriching the dedicated EGR cylinder group to provide the desired heat flux to heat the exhaust catalyst. The enriching may be based on each of the catalyst temperature and the flow through the bypass passage. For example, a degree of richness of the enriching may be increased as a difference between the catalyst temperature and the threshold increases, at a given bypass flow rate. As another example, the enriching includes after increasing a flow rate of exhaust through the bypass passage up to a threshold rate, maintaining the bypass valve while increasing a degree of richness of the enriching as the difference between the catalyst temperature and the threshold increases. In this way, the enriching of the dedicated EGR cylinder group may be adjusted to provide catalyst temperature control. It will be appreciated that the enriching may be further adjusted based on the engine dilution requirement. For example, the enriching may be adjusted to match the maximum of the two requirements.

After adjusting the enriching the routine returns to 314 to determine if further bypass valve flow rate adjustments are required. In this way, a position of a continuously variable bypass valve is adjusted to route a first portion of exhaust gas from an enriched dedicated EGR cylinder to an exhaust catalyst while routing a remaining portion of the hydrogen-enriched exhaust gas to an intake manifold, a ratio of the first portion relative to the second portion adjusted responsive to a temperature of the exhaust catalyst to maintain the catalyst at or above an activation temperature.

After adjusting the position of the bypass valve to provide the desired bypass flow rate at 322, the routine moves to 324 to enlean remaining engine cylinders (that is, the cylinders of the non-dedicated EGR cylinder group), the enleaning based on the enriching of the dedicated EGR cylinder and the bypass fraction to maintain a stoichiometric air-fuel ratio at the exhaust catalyst. For example, as the degree of richness of fueling the dedicated EGR cylinder group increases, a degree of leanness of fueling the remaining engine cylinders may be increased. Also, as the bypass flow fraction increases, the degree of leanness of fueling the remaining engine cylinders may be increased. It will be appreciated that if the by-pass fraction is zero, that is all (rich) flow from the dedicated EGR cylinder group is recirculated to the intake manifold, then no enleanment of the remaining cylinders may be required. By adjusting the leanness based on the amount of bypass flow received from the dedicated EGR cylinder, as well as the degree of richness of the flow received from the dedicated EGR cylinder, the overall air-fuel ratio at the exhaust catalyst may be maintained at or around stoichiometry.

In addition, the hydrocarbon, CO and H2 rich exhaust from the enriched first cylinder group (received at the exhaust catalyst via the bypass passage) may be combined with the oxygen-rich lean exhaust from the enleaned second cylinder group at the exhaust catalyst. This mixing provides a significant exothermic reaction at the catalyst with disabling EGR. This expedites catalyst heating while reducing the fuel and performance efficiency loss associated with disabling EGR during catalyst temperature control. In addition, catalyst temperature is maintained with minimum fuel energy usage.

In this way, bypass flow can be metered to rapidly increase catalyst temperature during a cold start as well as during engine operation. Once the front face of the catalyst is active, the metering of the bypass exhaust flow can be used to rapidly light a significant portion of the catalyst brick (prior to the first vehicle drive-away). This improves fuel economy because the exothermic reaction takes place in the exhaust catalyst and avoids all the heat transfer to the cylinder head, turbine, exhaust plumbing, etc. Overall, less CSER would be required.

It will be appreciated that while the routine of FIG. 3 suggests adjusting fuel on the dedicated EGR cylinder group based on the modeled or measured exhaust flow through the bypass valve to maintain catalyst temperature, in still further examples, spark timing may also be adjusted. For example, spark timing of at least the dedicated EGR cylinder group may be retarded from MBT, the spark retard increased as the heat flux required to raise the catalyst temperature increases. As another example, sparking timing on all cylinders may be retarded if additional heat flux is required.

It will be further appreciated that during engine operation, whether catalyst temperature control is required or not, the engine may be operated with one or more non-DEGR cylinders deactivated, the number of cylinders deactivated based on the engine dilution requirement and the engine load. For example, at mid-low engine loads, where fewer cylinders are required to meet the engine torque demand, and where higher EGR rates provide additional engine performance benefits, the engine may be operated in one of a plurality of modes wherein a progressively higher number of cylinders are deactivated to provide a progressively higher effective EGR rate. For example, at lower EGR requirements, a fewer (e.g., none or one) number of non-DEGR cylinders may be deactivated while at higher EGR requirements, a larger (e.g., two or three) number of non-DEGR cylinders may be deactivated.

In this way, a dedicated EGR cylinder is enriched to generate enriched exhaust gas. The enriched exhaust gas may include fuel enriched exhaust gas from the dedicated EGR cylinder when the bypass flow is not delivered via the WGS catalyst. Further, the enriched exhaust gas may include fuel and hydrogen enriched exhaust gas when the bypass flow is delivered via the WGS catalyst. As such, it may not be necessary for the bypass flow to go through the WGS catalyst. The WGS catalyst converts $H_2O$ and $CO$ into $H_2$ and $CO_2$. Either $H_2$ or $CO$ may react exothermically in the catalyst and heat up the catalyst.

Further, a first portion of the enriched exhaust gas is diverted to an exhaust catalyst while bypassing engine cylinders. Concurrently, a second, remaining portion of the exhaust gas is recirculated to an engine intake, and optionally passed through a WGS catalyst to increase hydrogen content, a ratio of the first portion relative to the second portion adjusted responsive to catalyst temperature. The ratio is adjusted responsive to catalyst temperature to maintain the catalyst temperature at or above a threshold temperature. The adjusting may include increasing the first portion while decreasing the second portion as the catalyst temperature falls below the threshold, and increasing the second portion while decreasing the first portion as the catalyst temperature rises above the threshold. A degree of richness of the enriching is adjusted based on the catalyst temperature, the degree of richness increased as the catalyst temperature falls below the threshold. The degree of richness is further adjusted based on the first portion of exhaust gas, the degree of richness increased as the first portion exceeds a threshold flow. Further, the method includes enleaning the remaining engine cylinders based on the enriching of the dedicated EGR cylinder and the by-pass flow fraction to maintain a stoichiometric air-fuel ratio at the exhaust catalyst. Further still, the method includes combining the first portion of exhaust from the dedicated EGR cylinder with exhaust received from the enleaned remaining engine cylinders at the exhaust catalyst to generate an exothermic reaction.

Figure 4:
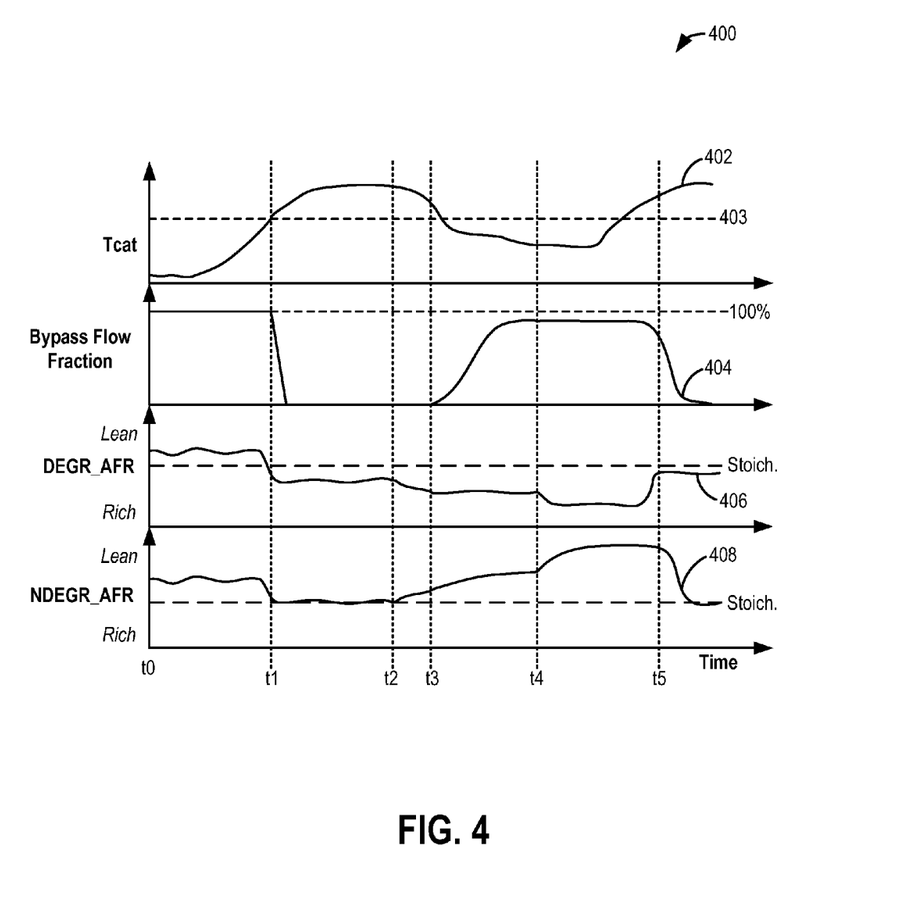
FIG. 4 shows an example adjustment of exhaust flow from a dedicated EGR cylinder to an exhaust catalyst via a bypass passage and to an engine intake via an EGR passage responsive to exhaust catalyst temperature.

Now turning to FIG. 4, an example bypass flow adjustment for exhaust catalyst temperature control is shown. Map 400 depicts exhaust catalyst temperature (Tcat) at plot 402, and a bypass flow fraction (that is, a portion of exhaust flow from the dedicated EGR cylinder delivered via the bypass passage) at plot 404. An air-fuel ratio of the dedicated EGR cylinder group is shown at plot 406 while an air-fuel ratio of the non-dedicated EGR cylinder group is shown at plot 408. All plots are shown over time (along the x-axis).

At t0, an engine cold-start condition may be confirmed. During the engine cold-start, between t0 and t1, in response to the exhaust catalyst temperature being lower than threshold 403, a bypass valve position may be adjusted to increase the portion of exhaust flow directed from the DEGR cylinder directed to the exhaust catalyst via the bypass passage. Specifically, the bypass valve position may be adjusted to increase the bypass flow fraction to 100%. The portion of exhaust flow recirculated from the DEGR cylinder to the engine intake via the EGR passage may be correspondingly decreased so that no EGR is provided during the cold-start. In addition, both the DEGR cylinder and the remaining engine cylinders may be operated leaner than stoichiometry during the cold-start.

The catalyst temperature may reach threshold 403 at t1 and may then continue to increase past threshold 403 and/or stabilize at a value above threshold 403. Thus, cold-start conditions may no longer be present. Accordingly, between t1 and t2, as the need for further heat flux to warm the catalyst decreases, the bypass valve may be adjusted to reduce the bypass flow fraction to 0%. Also between t1 and t2, while maintaining the low bypass flow rate, a degree of richness of the DEGR cylinder operation is slightly increased to provide fuel rich exhaust gas to the WGS catalyst. The WGS catalyst converts the fuel rich exhaust gas to hydrogen rich recirculated flow which improves combustion stability. The remaining cylinders may be maintained at stoichiometric operation.

Between t2 and t3, in response to light engine load conditions, the exhaust catalyst may undergo some cooling, while remaining above threshold 403. Because the catalyst temperature remains above the threshold 403 between t2 and t3, the bypass valve position may be maintained at the 0% position to maximize fuel economy. In addition, due to the change in engine operating conditions, the DEGR cylinder is further enriched to increase the hydrogen content in the recirculated flow, and thus, improve combustion stability at light engine load conditions.

Shortly after t3, the catalyst temperature may again drop below threshold 403 due to the exhaust cooling experienced during the light engine load conditions. Herein, catalyst temperature may be a trigger for bypass flow. To enable the temperature to be raised again, the bypass valve position is adjusted to increase bypass flow while decreasing recirculation flow from the DEGR cylinder. At the same time, enriching of the DEGR cylinder is maintained to expedite catalyst temperature control. Specifically, the bypass flow fraction may be gradually increased towards 100% to increase heat flux across the exhaust catalyst. Also between t3 and t4, the degree of richness of the DEGR cylinder is maintained while the degree of leanness of the remaining engine cylinders is adjusted based on change in bypass flow fraction. Specifically, as the bypass flow fraction increases, a leanness of the remaining engine cylinders is ramped in.

In one example, at a fixed engine speed and load between t2 and t4, the bypass valve is operated in the recirculating mode with more recirculation flow for some time (between t2 and t3) before switching to the exhaust bypass mode with more bypass flow (between t3 and t4).

Between t4 and t5, the catalyst temperature may remain below threshold 403. In the example shown in FIG. 4, the bypass flow fraction has reached a threshold value at t4. This may be due to reaching a calibrated limit where higher bypass fraction does not provide a significant fuel economy benefit compared to completely bypassing the flow. In another example, the bypass fraction may reach 100% and no further increase in bypass fraction is possible. Therefore, at t4 the DEGR cylinder is further enriched to increase the excess fuel in the exhaust. Also, a degree of leanness of the remaining engine cylinders is correspondingly adjusted based on the bypass flow fraction as well as the degree of richness of the DEGR cylinder to maintain stoichiometry in the exhaust. Thus, the degree of leanness of the remaining engine cylinders is made leaner after t4 than before t4. The excess fuel in the rich exhaust from the bypass flow may react using the excess air in the lean exhaust from the remaining engine cylinders to generate an exothermic reaction at the catalyst that expedites catalyst light-off above threshold temperature 403.

At t5, in response to the temperature of the exhaust catalyst being sufficiently hot, higher recirculation flow and lower bypass flow may be resumed and the fueling of the DEGR cylinder may again be adjusted based on engine dilution demand and combustion stability limits. Herein, while the catalyst temperature stabilizes to a higher value, the bypass flow fraction is reduced (e.g., to 0%) while the DEGR cylinder resumes slightly rich operation and the remaining engine cylinders resume stoichiometric operation.

In this way, exhaust catalyst temperature control is achieved by metering flow through a continuously variable bypass valve coupled downstream of a dedicated EGR cylinder group without requiring EGR to be disabled. Consequently, the adjusting of the bypass valve position may correlate with catalyst temperature changes rather than based only on engine speed and load. It will be appreciated, however, that in alternate examples, the bypass flow may be increased to an upper limit where substantially no recirculation flow is provided, and vice versa.

In one example, an engine system, comprises an engine having a first and a second cylinder group; an EGR passage selectively routing exhaust from the first cylinder group to an intake manifold of the engine, the EGR passage including a water-gas shift catalyst; a bypass passage coupling the EGR passage, downstream or upstream of the water-gas shift catalyst, to an exhaust manifold of the engine, upstream of an exhaust catalyst; a continuously variable bypass valve at a junction of the EGR passage and the bypass passage for varying a portion of exhaust from the first cylinder group routed via the bypass passage relative to the EGR passage; and a temperature sensor coupled to the exhaust catalyst. The engine system further includes a controller with computer-readable instructions for enriching the first cylinder group while enleaning the second cylinder group; and continuously adjusting an opening of the bypass valve to vary a proportion of exhaust routed from the first cylinder group to the exhaust catalyst via the bypass passage relative to exhaust recirculated to the engine intake manifold to maintain exhaust catalyst temperature at a threshold temperature. The enriching of the first cylinder group is based on a difference between the estimated exhaust catalyst temperature and the threshold temperature, a degree of richness increased as the difference increases. The enleaning of the second cylinder group is based on the enriching of the first cylinder group and a bypass flow fraction, a degree of leanness increased as the degree of richness increases to maintain stoichiometric air-fuel ratio at the exhaust catalyst. The degree of leanness also increased as the bypass flow fraction increases. The controller includes further instructions for, in response to the estimated exhaust catalyst temperature being higher than the threshold, reducing a degree of richness of the first cylinder group while adjusting the opening of the bypass valve to decrease routing of exhaust via the bypass passage to the exhaust catalyst. The controller includes further instructions for combining rich exhaust from the enriched first cylinder group received via the bypass passage with lean exhaust from the enleaned second cylinder group at the exhaust catalyst.

In another example, a method for an engine comprises adjusting a position of a continuously variable bypass valve to route a first portion of exhaust gas from an enriched dedicated EGR cylinder to an exhaust catalyst while routing a remaining portion of the hydrogen-enriched exhaust gas to an intake manifold, a ratio of the first portion relative to the second portion adjusted responsive to a temperature of the exhaust catalyst. The adjusting includes increasing the first portion relative to the second portion until the catalyst temperature is at or above a threshold temperature, and thereafter decreasing the first portion relative to the second portion. The method further includes concurrently routing exhaust from remaining engine cylinders to the exhaust catalyst, the remaining engine cylinders enleaned based on an enrichment of the dedicated EGR cylinder. A degree of richness of the enriched dedicated EGR cylinder is adjusted based on a deviation of the catalyst temperature from the threshold temperature, while a degree of leanness of the enleaned remaining engine cylinders is adjusted based on the degree of richness to maintain an exhaust air-fuel ratio at the exhaust catalyst at or around stoichiometry. Further, spark timing of the dedicated EGR cylinder may be adjusted based on the ratio of the first portion relative to the second portion, the spark timing retarded from MBT as the first portion increases. The temperature of the exhaust catalyst may be based on one or more of a catalyst model, direct measurement via a catalyst temperature sensor, an engine event number, and a duration of engine operation. Herein, diverting the first portion while recirculating the second portion includes adjusting a position of a continuously variable bypass valve coupled downstream of the dedicated EGR cylinder, a first opening of the bypass valve coupling the dedicated EGR cylinder to the exhaust catalyst, and a second opening of the bypass valve coupling the dedicated EGR cylinder to an engine intake. The adjusting is performed during an engine cold-start and continued during engine operation so that exhaust catalyst temperature can be maintained sufficiently hot throughout the duration of engine operation.

In this way, bypass flow of exhaust from a dedicated EGR cylinder group to an exhaust catalyst, while bypassing engine cylinders, can be metered based on catalyst heat requirement to maintain the exhaust catalyst temperature above an operational temperature. By allowing the bypass flow to be metered based on the catalyst temperature while a remainder of the exhaust is recirculated to the engine intake, catalyst temperature may be maintained without compromising EGR delivery. In particular, the catalyst can be heated during an engine cold-start or during engine operation without requiring EGR to be disabled. By concurrently adjusting fuel and spark of the cylinders based on catalyst temperature, the air-fuel ratio of the exhaust metered to the catalyst from the dedicated EGR cylinder can be made rich while the air-fuel ratio of the exhaust metered to the catalyst from the non-dedicated EGR cylinders is made lean, so that an exothermic reaction can be advantageously generated at the catalyst while maintaining stoichiometric tailpipe exhaust. Overall, exhaust emissions can be improved by accurate catalyst temperature control without degrading engine fuel economy.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   flowing exhaust from a dedicated EGR cylinder to each of an exhaust catalyst via a bypass passage and an engine intake via an EGR passage;
   adjusting, responsive to a catalyst temperature, a relative flow through the bypass passage and EGR passage via a bypass valve by increasing the relative flow through the bypass passage while correspondingly decreasing flow through the EGR passage as the catalyst temperature falls below a threshold, the threshold including a catalyst light-off temperature, and decreasing the relative flow through the bypass passage while correspondingly increasing flow through the EGR passage as the catalyst temperature exceeds the threshold;
   determining a required bypass flow rate to maintain the catalyst temperature at the threshold; and
   enriching the dedicated EGR cylinder based on each of the catalyst temperature and the required bypass flow rate.

2. The method of claim 1, wherein the bypass valve is a continuously variable bypass valve.

3. The method of claim 1, wherein a degree of richness of the enriching is increased as a difference between the catalyst temperature and the threshold increases.

4. The method of claim 3, wherein the enriching includes, after increasing a flow rate of exhaust through the bypass passage up to a threshold rate, maintaining the bypass valve flow while increasing a degree of richness of the enriching as the difference between the catalyst temperature and the threshold increases.

5. The method of claim 4, further comprising, enleaning remaining engine cylinders, the enleaning based on the enriching of the dedicated EGR cylinder and flow through the bypass passage to maintain a stoichiometric air-fuel ratio at the exhaust catalyst.

6. An engine system, comprising:
   an engine having a first and a second cylinder group;
   an EGR passage selectively routing exhaust from the first cylinder group to an intake manifold of the engine, the EGR passage including a water-gas shift catalyst;
   a bypass passage coupling the EGR passage, downstream of the water-gas shift catalyst, to an exhaust manifold of the engine, upstream of an exhaust catalyst;
   a continuously variable bypass valve at a junction of the EGR passage and the bypass passage for varying a portion of exhaust from the first cylinder group routed via the bypass passage relative to the EGR passage;
   a temperature sensor coupled to the exhaust catalyst configured to measure a catalyst temperature; and
   a controller with computer-readable instructions for:
   enriching the first cylinder group while enleaning the second cylinder group;
   determining a required bypass flow rate to maintain the catalyst temperature at a threshold temperature, wherein said threshold temperature includes a catalyst light-off temperature; and
   adjusting an opening of the bypass valve, continuously, to vary a proportion of exhaust routed from the first cylinder group to the exhaust catalyst via the bypass passage relative to exhaust recirculated to the engine intake manifold to maintain the catalyst temperature at the threshold temperature based on each of the catalyst temperature and the required bypass flow rate.

7. The system of claim 6, wherein the enriching of the first cylinder group is based on a difference between an estimated exhaust catalyst temperature and the threshold temperature, a degree of richness being increased as the difference increases.

8. The system of claim 7, wherein the enleaning of the second cylinder group is based on the enriching of the first cylinder group and the proportion of exhaust routed via the bypass passage, a degree of leanness being increased as a degree of richness increases or as the proportion of exhaust routed via the bypass increases to maintain a stoichiometric air-fuel ratio at the exhaust catalyst.

9. The system of claim 8, wherein the controller includes further instructions for: in response to the estimated exhaust catalyst temperature being higher than the threshold, reducing a degree of richness of the first cylinder group while adjusting the opening of the bypass valve to decrease routing of exhaust via the bypass passage to the exhaust catalyst.

10. The system of claim 6, wherein the controller includes further instructions for: combining rich exhaust from the enriched first cylinder group received via the bypass passage with lean exhaust from the enleaned second cylinder group at the exhaust catalyst.

* * * * *